United States Patent [19]

Panhorst et al.

[11] Patent Number: 5,093,136

[45] Date of Patent: Mar. 3, 1992

[54] DUAL GUM BASE BUBBLE GUM

[75] Inventors: Dorothy Panhorst, Morris Plains; Richard A. Reggio, Long Valley, both of N.J.

[73] Assignee: Nabisco Brands, Inc., Parsippany, N.J.

[21] Appl. No.: 697,176

[22] Filed: May 8, 1991

[51] Int. Cl.$^5$ .............................. A23G 3/30
[52] U.S. Cl. .......................... 426/5; 426/6
[58] Field of Search ........................ 426/3-6

[56] References Cited

U.S. PATENT DOCUMENTS

| | | | |
|---|---|---|---|
| 3,484,574 | 10/1976 | Comollo | 426/3 |
| 3,644,169 | 2/1972 | Phillips | 426/5 |
| 4,352,823 | 10/1982 | Cheruhuri et al. | 426/5 |
| 4,352,825 | 10/1982 | Cheruhuri et al. | 426/5 |
| 4,399,154 | 8/1983 | Puglia et al. | 426/5 |
| 4,808,418 | 2/1989 | Zamudio - Tena | 426/5 |

Primary Examiner—Jeanette Hunter

[57] ABSTRACT

A bubble gum made with SBR (styrene butadiene) gum base has both its initial bite and bubble quality improved by coblending PIB (polyisobutylene) gum base with the SBR base at a weight ratio of SBR:PIB of between 2:1 and 6:1, and preferably 3:1 to 4:1. The bubble gum may be naturally sweetened or sugarless and preferably contains hydrogenated starch hydrolysate (HSH).

7 Claims, No Drawings

DUAL GUM BASE BUBBLE GUM

FIELD OF THE INVENTION

This invention relates to bubble gum base compositions and more particularly to a dual bubble gum base composition that exhibits improved textural properties.

BACKGROUND OF THE INVENTION

Bubble gum compositions generally contain a water insoluble gum base (either natural rubber, synthetic rubber, or mixtures thereof), a water-soluble flavor, and water soluble sweeteners such as sucrose and corn syrup, or in a sugarless gum, sorbitol, mannitol and artificial sweeteners. Also incorporated within the gum base may be plasticizers to improve the film forming ability, consistency and texture of the gum.

Synthetic rubber gum bases have found extensive use in bubble gum formulations. In particular, the elastomer styrene-butadiene copolymer (SBR) has been used and has required the use of accompanying ester gums (glycerol esters of rosin) in order to effect compatibilization with other chewing gum base components, and in order to achieve desired film-forming properties for the bubble gum. Bubble gum bases made by use of SBR and ester gums characteristically are rigid, difficult to chew and require a significant amount of energy as well as the addition of extensive amounts of softeners, fillers, etc. to achieve the proper texture for use in a chewing gum.

Another synthetic rubber, polyisobutylene elastomer (PIB), has been used in bubble gum formulations but the art has considered it necessary to include certain accompanying ingredients to effect compatibilization with other components of the PIB-containing gum base. For example, U.S. Pat. No. 3,984,574 to Comollo discloses a gum base which includes polyisobutylene in combination with polyvinyl acetate but which also requires additional components such as hydrogenated or partially hydrogenated vegetable oils or animal fats in an amount of 5-50%, and filler (mineral adjuvants) in an amount of 5-40%, in order to achieve a non-tacky base. It is also disclosed that other elastomers may be employed in place of or together with the polyisobutylene, namely, polyisoprene, a copolymer of isobutylene and isoprene, or the copolymer of butadiene and styrene, but the amounts are not disclosed. In addition, polyvinyl acetate having a molecular weight of at least 2,000 is used in amounts up to 55%.

Cherukuri et al. in U.S. Pat. No. 4,352,822 discloses the use of polyisobutylene elastomers to make a bubble gum having film forming characteristics. The elastomer gum base used a combination of essential ingredients including glyceryl triacetate and acetylated monoglyceride as plasticizers, a polyterpine resin as an anti-tack agent, polyethylene wax and various other conventional chewing gum additives. A hydrophilic-type detackifier is disclosed to be used in amounts of 5 to 60%. This agent absorbs saliva and become slippery when the gum is chewed. An example of a detackifier is a vinyl polymer, such as polyvinyl acetate, polyvinyl butyl ester and copolymers of vinyl esters and vinyl ethers having a molecular weight from about 2,000 to about 10,000. Cherukuri et al. does not disclose incorporating SBR in the gum.

The prior art has recognized that it is possible to blend elastomers in a single bubble gum base and to blend bubble gum bases having similar compositions to obtain different textural characteristics. However, it is not known to blend bubble gum bases of dissimilar functional ingredients to achieve a textural advantage. That is, it is not known to combine one gum base, comprising an elastomer together with accompanying coingredients necessary or desired to improve the characteristics of that elastomer, with a second gum base, comprising a different elastomer together with its accompanying ingredients. The "accompanying ingredients", being compatible with one elastomer or the other and being selected to adapt properties to that elastomer, would be expected to be superfluous or even deleterious to the other elastomer or to any proposed combination thereof.

In addition, the ingredients present in a gum base contribute to film formation (and bubble formation) via a mechanism of coaction specific to that group of ingredients. Blending in a different gum base would be expected to disrupt both gum bases' mechanisms and prevent effective film/bubble formation.

For instance, PIB gum base uses polyisobutylene elastomer and plasticized, high molecular weight polyvinyl acetate as the film former. SBR gum base uses styrene butadiene elastomer in combination with an ester gum resin as the film former to achieve a textural or processing advantage. The SBR bubble gum base achieves good bubble formation at low cost but has the disadvantage of a hard chew initially. The PIB bubble gum base achieves superior bubble quality and compared to an SBR bubble gum base, a soft initial chew but at a higher cost.

Also, it is known that an SBR base bubble gum can be difficult to process in the plant under normal production techniques. The gum is sticky, stringy and too elastic. At times this results in difficulty in obtaining a final product. Thus far it is not known that anyone has suggested co-blending a PIB base into the gum to improve the processing conditions.

It would be highly desirable to improve the bubble quality and initial chew properties of an SBR base bubble gum formulation in an inexpensive and simple manner.

It would also be desirable to achieve the same bubble quality and chew properties of a PIB base bubble gum but at a lower cost.

It would also be desirable to improve the processing qualities of an SBR base bubble gum by addition of another gum base to the bubble gum that makes the gum easier to process.

SUMMARY OF THE INVENTION

A bubble gum has now been found exhibiting improved processing qualities, improved initial texture on chewing, and improved bubble quality, as a coblend of an SBR gum base and a PIB gum base, preferably at a weight ratio of SBR base:PIB base of between 2:1 and 6:1, and more preferably 3:1 to 4:1. The bubble gum can also contain hydrogenated starch hydrolysate (HSH) which enhances these effects; this fact further confirms the unexpected favorable behavior of this gum, since HSH would be expected to render an SBR-containing bubble gum difficult to process.

DETAILED DESCRIPTION OF THE INVENTION

Typical bubble gum compositions of the present invention comprise a chewing gum base, a gum base modifier, a bulking agent (sorbitol), and one or more other additives such as glycerine, fillers, flavoring agents, colorants and antioxidants. The modifying agents are used to soften, plasticize and/or compatibilize one or more of the components of the gum base and/or of the formulation as a whole.

The bubble gum products of the present invention have the following general formulation:

| COMPONENT | WEIGHT % OF COMPONENT BROAD RANGE |
|---|---|
| gum base | 15 to 35 |
| gum base modifier | 0 to 5 |
| bulking agent | 0 to 90 |
| intense sweetener | 0 to 2 |
| hydrogenated starch hydrolysate (HSH) | 0 to 35 |
| fillers | 0 to 35 |
| glycerine | 0 to 30 |
| Total | 100 |

In making a bubble gum product in accordance with the present invention, the following SBR base:PIB base formulation may be used as the "gum base" in the weight ratio recited above.

| | WEIGHT % OF COMPONENT IN BUBBLE GUM BASE FOR | |
|---|---|---|
| Component | SBR | PIB |
| masticatory material | 8-15 | 5-15 |
| plasticizer for material | 2-10 | 20-30 |
| hydrophilic detackifier | 2-7 | 10-20 |
| plasticizer for detackifier | 1-5 | 1-5 |
| wax | 7-15 | 5-15 |
| mineral filler | 35-45 | 20-35 |
| rosin esters | 30-40 | 0-15 |

The masticatory material is a synthetic elastomeric substance. For SBR gum base, this elastomer is styrene-butadiene copolymer. For PIB gum base, this elastomer is polyisobutylene.

The plasticizer for the masticatory substance should have minimal tackifying properties and will preferably comprise a hydrogenated ester gum, that is a glycerol ester of hydrogenated resin and/or dimerized ester gum. However, other resins may be employed such as pentaerythritol ester gum, polymerized ester gum, polyterpene resin and ester gum.

The hydrophilic-type detackifier is a material which will absorb saliva and preferably comprises a vinyl polymer having a molecular weight of at least 2,000, and preferably of about 2,000 to 80,000 or more, such as polyvinyl acetate, polyvinyl butyl ether and copolymers of vinyl esters and vinyl ethers.

Suitable plasticizers for the hydrophilic type detackifiers include lanolin, stearic acid, sodium stearate, triacetin, acetylated glycerides and other flavor adjuvants such as ethyl acetate and triether citrate.

The waxes which are used serve primarily as compatibilizers. Examples of appropriate waxes are paraffin wax, candelilla wax, carnauba wax, microcrystalline waxes and polyethylene waxes.

Suitable mineral fillers include calcium carbonate, titanium dioxide, talc, alumina, dicalcium phosphate, tricalcium phosphate, magnesium hydroxide and mixtures thereof.

The gum base may also include a softening agent and lubricant combination which may comprise one or more hydrogenated vegetable or animal fats.

The gum base may also include about 0 to about 2.0%, and preferably about 0.1 to about 0.7% of an emulsifier to impart hydrophilic properties to the gum base. Examples of such emulsifiers includes phosphatides such as lecithin, in addition to that used in the gum base modifier, and mono- and diglycerides of these fatty acids and mixtures thereof, with glyceryl monostearate being preferred.

In addition, the gum base may include antioxidants such as butylated hydroxy toluene, butylated hydroxy anisole and propyl gallate.

The presence of both indicated gum bases results in a gum product having enhanced properties described below, with a minimization of the drawbacks that would otherwise be expected from each gum base. This is unexpected because one would have no reason to expect such an improved result, and because one would have reason to expect the two gum bases to interfere with each other and thereby lead to an undesirable product.

Chewing Gum Products

The preferred chewable products in which the dual gum base of the present invention may be used are chewing gum products of the bubble gum type. The SBR gum base and the PIB gum base are coblended, as described below.

The chewing gum compositions contemplated by the present invention comprise all types of sugarless and sugar bubble gums. The sugar or sugar substitute used in the compositions of this invention include natural sugars or non-sugar sweeteners. The amount of natural sugars which can be present in the final composition can range from 10 to 90% by weight, preferably 40-70%. The term "natural sugar" includes one or more sugar containing materials, for example, monosaccharides of 5 to 6 carbon atoms, such as arabinose, xylose, or sorbose or mixtures of two or more of the foregoing monosaccharides; disaccharides such as sucrose, for example, cane or beet sugar including sucrose and dextrose, lactose, maltose or cellobiose; and polysaccharides such as dextrin, or corn syrup solids. The amount of non-sugar sweetener which can be used can range from 0.05 to about 2 weight percent of the final composition. At least one of such sweeteners is employed. The intense sweeteners include poorly water-soluble, as well as water-soluble sweeteners, such as the free acid form of saccharin, sodium, calcium, or ammonium saccharin salts, aspartame or APM (L-aspartyl-L-phenylalanine methyl ester), dihydrochalcones, glycyrrhizin, dipotassium glycyrrhizin, glycyrrhizic acid/ammonium salt, talin, acesulfame K, as well Stevia rebaudiana (Stevioside), Richardella dulcifica (Miracle Berry), Dioscoreophylim cumminisii (Serendipity Berry), free cyclamic acid and cyclamate salts and the like or mixtures of any two or more of the above.

The chewing gum compositions of the present invention are preferably sugarless. The preferred intense sweetener employed in the present invention is APM (aspartame) at a level of 0.1 to 0.5% by weight. Other intense sweeteners which may be employed in combination with the aspartame sweetener of the present invention include poorly water soluble, as well as water-soluble sweeteners.

The bubble gum of this invention will preferably contain 10-75% by weight sorbitol, xylitol, mannitol or other polyhydric alcohols as the bulking agent. However, other bulk sweeteners commonly used in chewing gums can be used. These include natural sugars (sucrose, dextrose, lactose, maltose, and xylose). Hydrogenated starch hydrolysates (including hydrogenated corn syrup and hydrogenated glucose syrup) at a level of 5-20% as well as the sugar alcohols, and mixtures thereof can also be used.

The chewing gum made by this invention can also contain 0.1-4% glycerine, 0.1-3% lecithin, conventional FD&C and natural coloring agents. The flavoring which can be included in the chewing gum compositions made according to this invention can comprise one or more natural and/or synthetic flavors and/or oils derived from plants, leaves, flowers and fruit. Representative flavors and oils of these types include acids such as adipic, succinic and fumaric acid; citrus oils such as lemon oil, orange oil, lime oil and grapefruit oil; fruit essences, such as apple essence, pear essence, peach essence, strawberry essence, apricot essence, raspberry essence, cherry essence, plum essence, and pineapple essence; essential oils such as cinnamon oil, peppermint oil, spearmint oil, mixtures of peppermint oil and spearmint oil, clove oil, bay oil, anise oil, oil of nutmeg, oil of sage, oil of bitter almonds, cassia oil and methylsalicylate (oil of wintergreen). Various synthetic flavors, such as those for citrus (lemon, orange, grape, lime and grapefruit), fruit (apple, cherry, strawberry and pineapple), and cinnamon, may also be incorporated in the chewing gum.

Preparation of Chewing Gum Product

The chewing gum products of the present invention are prepared by first separately preparing the SBR and PIB gum bases. To then prepare the sugarless chewing gum formulation, the gum bases are coblended and melted, at a temperature about 190° to 250° F., and the other components of the composition are added thereto. The resulting composition is uniformly admixed. This takes about 3 to 7 minutes for each of the respective components used in commercial sized batches of these formulations. Each of the components is usually separately added to the formulated composition and uniformly mixed in before the next component is added. All of the admixing operations are conducted at temperatures in the range of about 112° to 185° F., and preferably about 125° to 180° F. for a total mixing time, at such temperatures, of about 10 to 25 minutes. The operations do not have to be conducted under anhydrous conditions in preparing the compositions of the present invention, and any amounts of moisture that are normally present in the raw materials that are used in the compositions of the present invention do not usually have to be removed therefrom either prior to, or during the formulating process.

The liquid sorbitol has a solids content of about 70%. The solid sorbitol is a high (80%) gamma form having a M.P. of 99° C. The aspartame, when used at a 0.10 to 0.50 weight % formulation level, is usually admixed, proportionally, with about 10 to 50 pounds of the formulated amount of powdered sorbitol before being added to the mixing vessel. When being admixed in and further processed the aspartame in the compounded product is usually exposed to a heat history of 120° to 140° F. for up to about 20 to 30 minutes.

It is preferable to prepare separate bases and adjust the blend ratio to that most suitable to the particular flavoring agents and other ingredients employed, rather than to make one base of all components to use in all flavors, because different flavors have differing plasticizing effects on the bases.

The test formulations are prepared using production plant procedures. These procedures are as follows:

Production Plant Procedure

1. Into a pre-warmed sigma bladed mixer add molten gum base. The gum base temperature is between 150°-200° F., and preferably between 170°-190° F.
2. With the blades of the mixer operating, and the temperature in the cited range, the lecithin is added and the mixing is continued for one minute.
3. Add ⅓ of the bulk sweetener (sorbitol powder) and mix for two minutes, or until homogeneous.
4. Add ½ of the sorbitol solution mix for two minutes, or until homogeneous.
5. Add ⅓ of the sorbitol powder and continue mixing for two minutes.
6. The liquid flavor is then added and mixing is continued for one minute.
7. Add the second ½ of the sorbitol solution and mix for two minutes.
8. Add the remaining ⅓ of the sorbitol powder and the aspartame. Prior to production of the batch, the aspartame is premixed with approximately ⅓ of the sorbitol powder. Continue mixing for two minutes, or until the batch is homogeneous. The final gum temperature is approximately 112° F.
9. The gum is removed from the mixer and conditioned at 70° F./ambient R.H. prior to forming.
10. The gum is rolled and scored into a stick configuration. Mannitol is applied to the surface of the scored gum to prevent surface adhesion. The gum can then be packaged.

EXAMPLES 1-3

Three sugarless bubble gum products were made using the pilot plant procedure described above and using the following formulations, in a % by weight as follows:

| WEIGHT % OF COMPONENT IN EXAMPLE | | | |
| --- | --- | --- | --- |
| Component | 1 | 2 | 3 |
| SBR elastomer gum base | 17 | 19 | 27 |
| PIB elastomer gum base | 7.3 | 8 | — |
| sorbitol powder | 47 | 49.9 | 48.9 |
| sorbitol solution | 25 | 7 | 8 |
| hydrogenated starch hydrolysate (HSH) | — | 9 | 9 |
| glycerin | — | 3 | 3 |
| flavors, sweeteners and colorant | 3.7 | 4.1 | 4.1 |
| TOTAL | 100.0 | 100.0 | 100.0 |

Example 3 serves as a control example, while Examples 1 and 2 illustrate the dual gum base of this invention. The products of Examples 1 and 2 gave a soft initial chew compared to the Example 3 (SBR) control which had a hard initial chew. Examples 1 and 2 product also had improved bubble quality over the Example 3 product. By "bubble quality" is meant the ease of forming a bubble and the film strength of the formed bubble. In addition, both products in Examples 1 and 2 were notably easy to process. That is, in the step no. 10 described above, when the gum was rolled out, it remained flat, readily took the desired reductions of thickness, and did not stick to the rollers. Such behavior is highly unexpected particularly as to the product in Example 2, containing HSH.

What is claimed is:

1. A bubble gum of soft initial bite and improved bubble quality comprising a coblend of SBR gum base and PIB gum base at an SBR base:PIB base weight ratio of between 2:1 and 6:1.

2. The bubble gum of claim 1 wherein the SBR base:PIB base ratio is between 3:1 and 4:1.

3. The bubble gum of claim 1 further comprising natural sugar at a level of 40-70% by weight.

4. The bubble gum of claim 1 further comprising 10-75% sorbitol, 0.1-3% lecithin, 0.05-2% artificial sweetener, flavor and color.

5. The bubble gum of claim, 1 further comprising 10-75% sorbitol, 0.1-3% lecithin, 5-20% hydrogenated starch hydrolysate (HSH), 0.1-4% glycerin, 0.1-0.5% aspartame APM), flavor and color.

6. A method of making a bubble gum of soft initial bite and improved bubble quality, comprising coblending-SBR gum base and PIB gum base at an SBR base:PIB base weight ratio of between 2:1 and 6:1.

7. The method of claim 6 wherein the SBR base:PIB base weight ratio is between 3:1 and 4:1.

* * * * *